United States Patent
Okamura

(10) Patent No.: US 8,369,698 B2
(45) Date of Patent: Feb. 5, 2013

(54) IMAGE BLUR CORRECTION APPARATUS AND CAMERA

(75) Inventor: Takashi Okamura, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 11 days.

(21) Appl. No.: 13/192,605

(22) Filed: Jul. 28, 2011

(65) Prior Publication Data

US 2012/0027391 A1 Feb. 2, 2012

(30) Foreign Application Priority Data

Jul. 29, 2010 (JP) .................................. 2010-170879

(51) Int. Cl.
*G03B 17/00* (2006.01)
*H04N 5/228* (2006.01)

(52) U.S. Cl. ...................................... 396/55; 348/208.7
(58) Field of Classification Search .............. 396/52–55; 348/208.7, 208.11; 359/557
See application file for complete search history.

(56) References Cited

U.S. PATENT DOCUMENTS

| 5,883,742 | A | * | 3/1999 | Kamata .......................... 359/557 |
| 2009/0027507 | A1 | * | 1/2009 | Kobayashi et al. ...... 348/208.11 |
| 2010/0178044 | A1 | * | 7/2010 | Ohno .............................. 396/55 |
| 2011/0097061 | A1 | * | 4/2011 | Lee et al. ........................ 396/55 |
| 2011/0286732 | A1 | * | 11/2011 | Hosokawa et al. ............. 396/55 |

FOREIGN PATENT DOCUMENTS

| JP | 2008-225135 | 9/2008 |
| JP | 2008-299286 | 12/2008 |

* cited by examiner

*Primary Examiner* — Christopher Mahoney
(74) *Attorney, Agent, or Firm* — Volpe and Koenig, P.C.

(57) ABSTRACT

The invention provides an image blur correction apparatus including: a tabular base portion; a movable portion that holds an image pickup device and that is movable with respect to the base portion; and a voice coil motor that has a permanent magnet arranged on a face of the base portion that faces the movable portion, and a coil arranged in a region of the movable portion facing the permanent magnet, and that generates a force that moves the movable portion by an electromagnetic force. The base portion is composed of a magnetic body. A tabular second magnetic body portion composed of a magnetic body that, when viewed from the incident light axis direction, occupies a region surrounding the external shape of the permanent magnet is arranged on the base portion side of the permanent magnet.

7 Claims, 9 Drawing Sheets

IMAGE BLUR CORRECTION APPARATUS AND CAMERA

CROSS REFERENCE TO RELATED APPLICATION

This application claims the benefit of Japanese Application No. 2010-170879 filed in Japan on Jul. 29, 2010, the contents of which are incorporated herein by this reference.

BACKGROUND OF THE INVENTION

1. Field of the Invention

The present invention relates to an image blur correction apparatus and a camera that correct an image blur caused by shaking by changing the position of an image pickup device.

2. Description of the Related Art

Conventionally, in a camera equipped with an image blur correction apparatus that corrects an image blur caused by camera shake due to hand shaking or the like by changing the position of an image pickup device, for example, a voice coil motor (hereunder, referred to as "VCM") is applied as an actuator that changes the position of the image pickup device. Japanese Patent Application Laid-Open Publication No. 2008-225135 discloses an image blur correction apparatus that moves an image pickup device by means of a VCM. Further, for example, as disclosed in Japanese Patent Application Laid-Open Publication No. 2008-299286, a VCM is also used for auto-focus driving of a lens.

To reduce the size of a camera body and improve the image blur correction performance, it is necessary to decrease the size of a driving mechanism of a VCM while maintaining the driving output thereof. To achieve this, for example, use of a permanent magnet with a strong magnetic force may be considered. However, if only the magnetic force of the permanent magnet is strengthened, the leakage of magnetic flux from the VCM will increase and in some cases the leakage may affect the operation of other electronic components contained in the camera.

Therefore, in order to prevent leakage of magnetic flux from a VCM in, for example, an image blur correction apparatus as disclosed in Japanese Patent Application Laid-Open Publication No. 2008-225135, for example, a method can be considered in which a magnetic body that covers the outer side of a permanent magnet is formed with a thick thickness.

SUMMARY OF THE INVENTION

An image blur correction apparatus according to the present invention includes: a tabular base portion; a movable portion that is supported so as to be movable in a first direction and a second direction that are orthogonal to an incident light axis with respect to the base portion, and that holds an image pickup device; and a voice coil motor that has a permanent magnet arranged on a face of the base portion that faces the movable portion, and a coil arranged in a region of the movable portion facing the permanent magnet, and that generates a force that moves the movable portion by an electromagnetic force; wherein: the base portion is composed of a magnetic body; and a tabular second magnetic body portion composed of a magnetic body that, when viewed from the incident light axis direction, occupies a region surrounding an external shape of the permanent magnet is arranged on the base portion side of the permanent magnet. Further, a camera of the present invention is equipped with the above described image blur correction apparatus.

DETAILED DESCRIPTION OF THE PREFERRED EMBODIMENT

Figure 1:
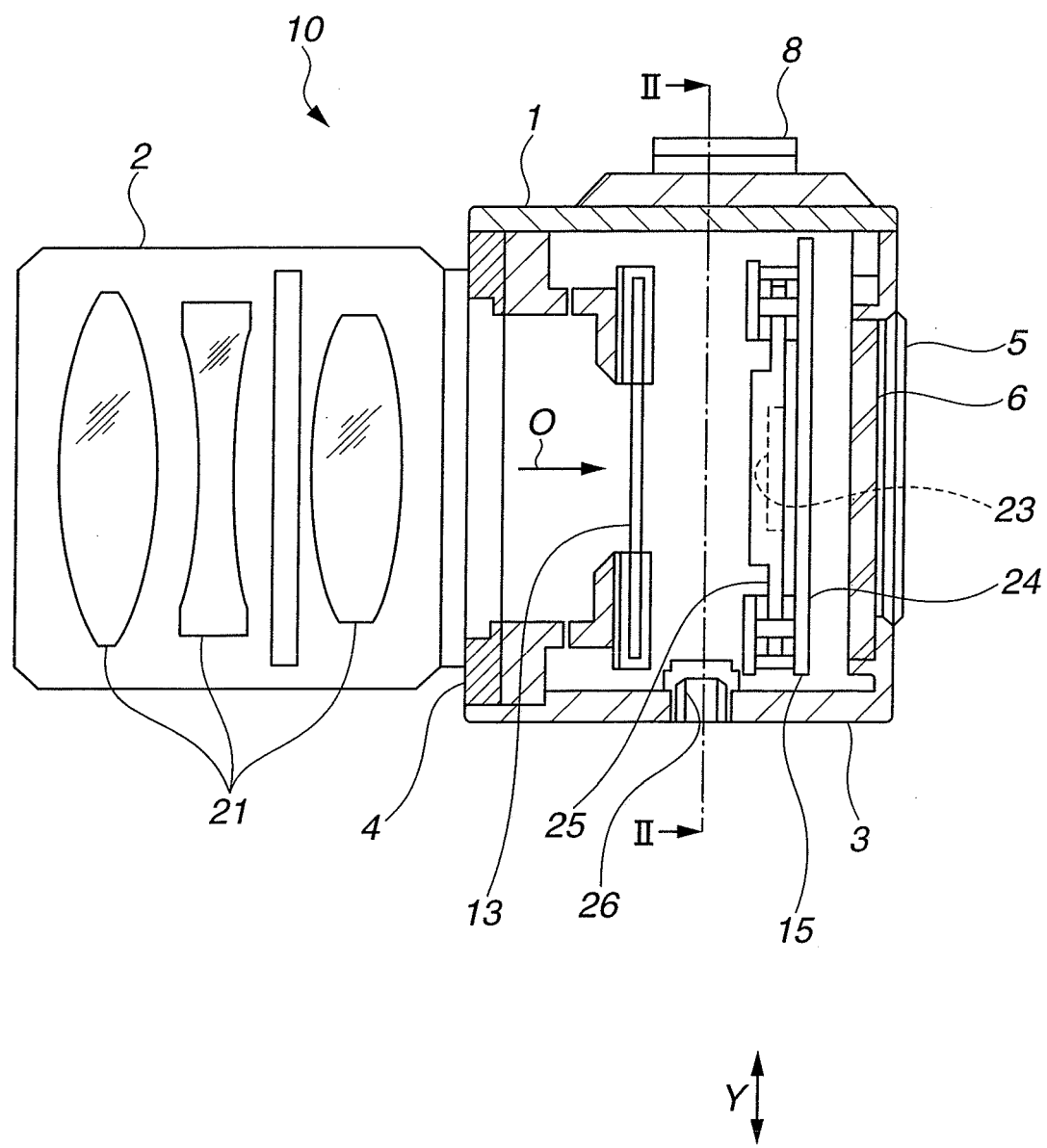
FIG. 1 is a longitudinal section along the optical axis of a taking lens of a digital camera with interchangeable lenses (hereafter, referred to as "camera") that is equipped with an image blur correction apparatus that is one embodiment of the present invention.

A preferred embodiment of the present invention is described hereunder with reference to the drawings. It should be noted that the components in the drawings referred to in the following description are each displayed in a different contraction scale so as to be shown in a size that is recognizable in the drawings. Further, the present invention is not limited only to the quantity of components, the shapes of components, the ratios between the sizes of components, and the relative positional relationship between the respective components described in the drawings.

Figure 2:
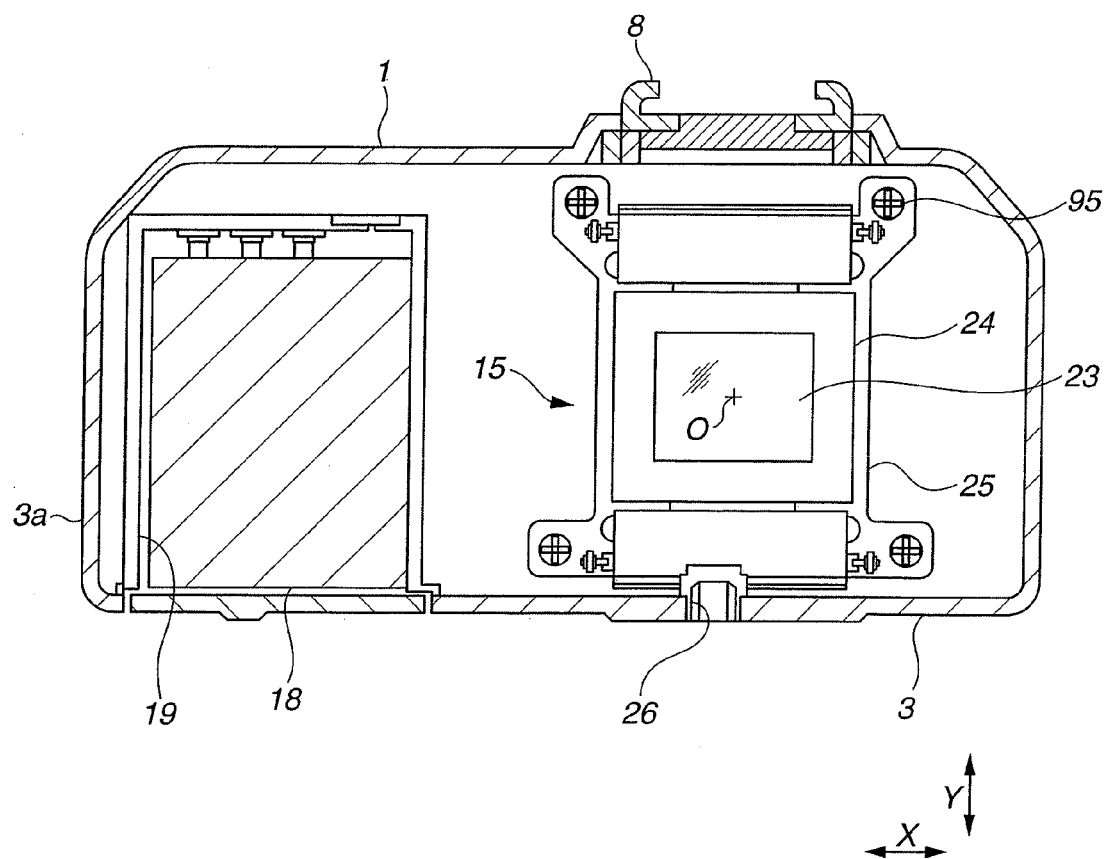
FIG. 2 is a sectional view along a line II-II in FIG. 1.

As shown in FIG. 1 and FIG. 2, a camera 10 that includes an image blur correction apparatus according to an embodiment of the present invention includes a camera body 1 and a lens unit 2 that includes taking lenses 21 that are exchangeably mounted to the camera body 1.

In the following description, an incident light axis along which light is incident on the camera body 1 from the taking lenses 21 is denoted by reference character "O", a subject side with respect to the incident light axis O direction is taken as a front (front surface side), and an image formation side is taken as a rear (back surface side). Further, among directions that are orthogonal to the optical axis O, a left-to-right direction as viewed from the front in a normal photographing state is taken as an X direction that is a first direction, and a vertical direction is taken as a Y direction that is a second direction.

The camera body 1 includes an exterior body 3 that also serves as a camera main body that houses members constituting the camera 10, and is equipped with a ring-shaped mount portion 4 for exchangeably mounting the lens unit 2 to a position on the front side on the incident light axis O. A grip portion 3a is provided on a left side of the exterior body 3 as viewed from the front. A user holds the grip portion 3a in a right hand when photographing. Various switches and buttons such as a release button which are not shown in the drawings are disposed on a top portion of the grip portion 3a.

As shown in FIG. 1 and FIG. 2, the camera body 1 also includes a liquid crystal panel 6 having a panel display window 5 on a back surface side of the exterior body 3. The liquid crystal panel 6 is a TFT (Thin Film Transistor) type rectangular display panel that, in addition to displaying photographed images, displays various kinds of information such as various settings and adjustment items as images. Further, a hot shoe 8 for mounting an optical finder, an electronic viewfinder, an external flash, or a microphone or the like is provided on the top portion of the exterior body 3.

As shown in FIG. 1, a focal plane shutter 13 and an image pickup unit 15 are arranged inside the exterior body 3 of the camera body 1. The image pickup unit 15 supports an image pickup device 23 that is a CCD or a CMOS sensor or the like so as to be displaceable along an X-Y plane, and includes an image blur correction apparatus that utilizes a voice coil motor (hereunder, referred to as "VCM") as an actuator. The image pickup device 23 has a rectangular light receiving surface, and is arranged so that a long side of the light receiving surface is disposed along the X direction. A tripod screw portion 26 is also provided in a bottom surface portion of the exterior body 3.

The camera body 1 also includes a battery housing chamber 19 that houses a battery 18 inside the grip portion 3a of the exterior body 3. Although not shown in the drawings, a control circuit for performing control of the entire camera, image processing, compression processing, data storage processing and the like, as well as a circuit board on which a memory such as an SDRAM, a power supply circuit and the like are mounted are also provided at the rear of the battery housing chamber 19 inside the grip portion 3a. The camera body 1 also contains a gyro sensor (unshown) for detecting a shake state of the camera body.

A configuration of the image pickup unit 15 including an image blur correction apparatus of the present invention will now be described in detail. As shown in FIG. 3 to FIG. 6, the image pickup unit 15 includes a base portion 24 that is fixed to an inside of the exterior body 3, and a movable portion 25 that is supported so as to be movable in the X direction and Y direction with respect to the base portion 24. The movable portion 25 is supported by a form that is generally referred to as "ball support", by interposing four spherical ball members 34a, 34b, 34c, and 34d between the movable portion 25 and the base portion 24. The movable portion 25 is supported so as to be movable with respect to the base portion 24 by movement of the ball members 34a, 34b, 34c, and 34d.

Figure 7:
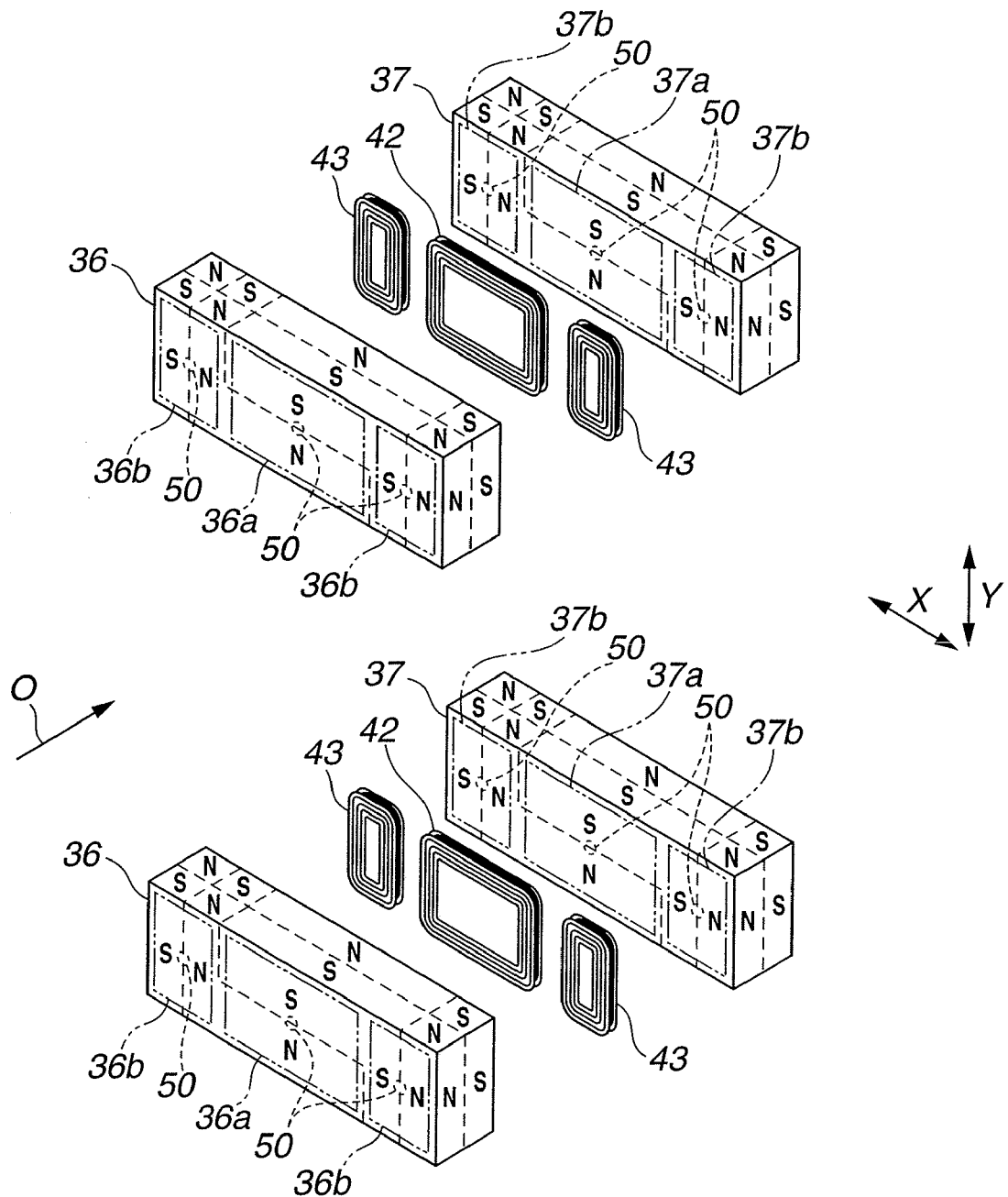
FIG. 7 is a view that illustrates the arrangement of permanent magnets and coils that constitute voice coil motors of the image pickup unit.

The image pickup unit 15 includes so-called moving coil-type VCMs. As shown in FIG. 7, VCMs of the image pickup unit 15 are constituted by permanent magnets 36 and 37 that are fixed to the base portion 24 and Y-direction driving coils 42 and X-direction driving coils 43 that are fixed to the movable portion 25, which is described in detail later. When the image pickup unit 15 is viewed from the front (viewpoint of FIG. 3), the permanent magnets 36 and 37, the Y-direction driving coils 42, and the X-direction driving coils 43 that constitute the VCMs are arranged above and below the image pickup device 23.

First, the configuration of the base portion 24 will be described. The base portion 24 is composed of a magnetic body, such as iron, and is a tabular member that has a substantially rectangular shape when viewed from the front. The base portion 24 is fixed to the exterior body 3 by screws 95 that are inserted through unshown through-holes provided at the four corners thereof. The base portion 24 is disposed so that a predetermined pair of parallel sides is arranged along the Y direction. That is, the tabular base portion 24 is disposed so as to be arranged along the X-Y plane inside the camera 10.

Two magnet support portions 32 composed of a magnetic body, such as iron, are fixed to the front of the base portion 24. The two magnet support portions 32 are plate-shaped members that have a substantially rectangular shape when viewed from the front. The two magnet support portions 32 are fixed via columnar support members 33 on a face on the front of the base portion 24 in a state in which the magnet support portions 32 are separated by a predetermined distance from the base portion 24. Note that a form may be adopted in which the magnet support portions 32 are integrally formed with the base portion 24.

The two magnet support portions 32 are arranged so that the long sides thereof are disposed along the X direction above and below the image pickup device 23 as viewed from the front of the image pickup unit 15. Further, the magnet support portions 32 have a planar shape that is substantially the same as that of the permanent magnets 36 that are described later, or is larger than the permanent magnets 36, as viewed from the front of the image pickup unit 15.

The permanent magnets 36 (second permanent magnets) and 37 are fixed onto faces which are facing each other of the magnet support portions 32 and the base portion 24, respectively. The permanent magnets 36 and 37 have substantially the same rectangular, tabular external shape as each other. As described above, as viewed from the front of the image pickup unit 15, the two magnet support portions 32 are arranged above and below the image pickup device 23, and hence the permanent magnets 36 are fixed to the rear of the two magnet support portions 32, respectively. Further, the permanent magnets 37 are fixed to the front of the base portion 24 so as to face the two permanent magnets 36.

The permanent magnets 36 and 37 that are arranged so as to be facing each other in the front-to-rear direction (incident light axis O direction) are separated by a predetermined distance in the front-to-rear direction in a state in which the permanent magnets 36 and 37 are fixed to the magnet support portions 32 and the base portion 24, respectively.

Accordingly, in the image pickup unit 15, there are two sets of permanent magnets 36 and 37 that face each other in the front-to-rear direction, and each of the sets are fixed to the base portion 24 so that respective long sides thereof are disposed along the X direction above and below the image pickup device 23 as viewed from the front of the image pickup unit 15. The permanent magnets 36 and 37 are arranged so as to be separated by a predetermined distance in the front-to-rear direction (incident light axis O direction). As shown in FIG. 7, the Y-direction driving coils 42 and X-direction driving coils 43 that are fixed to the movable portion 25 as described later are arranged in a space between the mutually facing permanent magnets 36 and 37.

As shown in FIG. 7, two end portions of the permanent magnets 36 in the longitudinal direction (X direction) are magnetized with opposite polarities in the X direction, and center portions thereof are magnetized with opposite polarities in the Y direction. Similarly, two end portions of the permanent magnets 37 in the longitudinal direction are magnetized with opposite polarities in the X direction, and center portions thereof are magnetized with opposite polarities in the Y direction. Further, the permanent magnets 36 and 37 are magnetized so that regions that face each other in the front-to-rear direction have different polarities.

Hereunder, the center portions that are magnetized with opposite polarities in the Y direction of the permanent magnets 36 and 37 are referred to as "magnetic region portions for Y-direction driving 36a and 37a". Further, the two end portions that are magnetized with opposite polarities in the X direction of the permanent magnets 36 and 37 are referred to as "magnetic region portions for X-direction driving 36b and 37b".

A method of fixing the permanent magnets 36 and 37 to the magnet support portions 32 and the base portion 24 is not particularly limited, and may be a method that utilizes an adhesive, screwing, caulking or the like. As one example according to the present embodiment, the permanent magnets 36 and 37 are fixed to the magnet support portions 32 and the base portion 24 by an adhesive.

More specifically, one or a plurality of through-holes 51 and 52 are formed in mutually facing regions of the magnet support portions 32 and the base portion 24, respectively, and the base portion 24 and the permanent magnets 37 are fixed together by an adhesive that is filled inside the through-holes 51 and 52. To prevent leakage of magnetic flux from the through-holes 51 and 52, preferably the through-holes 51 and 52 are provided at portions at which magnetic flux densities of the permanent magnets 36 and 37 are low. For example, the through-holes 51 and 52 are provided at boundary portions of magnetic poles of the permanent magnets 36 and 37. Here, the term "boundary portions of magnetic poles of the permanent magnets 36 and 37" refers to regions denoted by reference numeral 50 in FIG. 7.

Second magnetic body portions 32a and 31a that are composed of a magnetic body, such as iron, are fixed to faces on opposite sides to the faces on which the permanent magnets 36 and 37 are arranged of the magnet support portions 32 and the base portion 24, respectively. The second magnetic body portions 32a and 31a are plate-shaped members of a predetermined thickness that, as viewed from the front of the image pickup unit 15, have a planar shape that is substantially the same as the shape of the permanent magnets 36 and 37 or is larger than the shape of the permanent magnets 36 and 37. Further, as viewed from the front of the image pickup unit 15, the second magnetic body portions 32a and 31a are fixed so as to occupy a region that is the same shape as the external shape of the permanent magnets 36 and 37 or a region that surrounds the external shape of the permanent magnets 36 and 37, respectively.

A method of fixing the second magnetic body portions 32a and 31a to the magnet support portions 32 and the base portion 24 is not particularly limited, and may be a method that utilizes an adhesive, spot welding, screwing, caulking or the like. As one example according to the present embodiment, the second magnetic body portions 32a and 31a are fixed to the magnet support portions 32 and the base portion 24 by an adhesive. More specifically, the second magnetic body portions 32a and 31a are fixed to the magnet support portions 32 and the base portion 24 using an adhesive that is filled inside the through-holes 51 and 52.

Although the thickness of the second magnetic body portions 32a and 31a is not particularly limited, as one example according to the present embodiment, the thickness of the second magnetic body portions 32a and 31a is substantially equal to the thickness of regions of the magnet support portions 32 and the base portion 24 at which the second magnetic body portions 32a and 31a are fixed, respectively.

As described above, the magnet support portions 32 and the second magnetic body portions 32a that are each composed of a magnetic body are arranged in front of the permanent magnets 36 in a state in which the magnet support portions 32 and the second magnetic body portions 32a overlap in the front-to-rear direction. Further, at the rear of the permanent magnets 37, the base portion 24 and the second magnetic body portions 31a that are each composed of a magnetic body are arranged in a state in which the base portion 24 and the second magnetic body portions 31a overlap in the front-to-rear direction. The magnet support portions 32, the base portion 24, and the second magnetic body portions 32a and 31a that are composed of a magnetic body that are arranged at the front and rear of the permanent magnets 36 and 37 function as yokes and constitute one portion of a magnetic circuit of each VCM.

Next, a configuration of the movable portion 25 will be described. According to the present embodiment, the movable portion 25 is arranged in front of the base portion 24. Note that a configuration may also be adopted in which the movable portion 25 is arranged at the rear of the base portion 24, and the image pickup device 23 is exposed to the front from an opening portion provided in the base portion 24.

The movable portion 25 is composed of a non-magnetic body, such as aluminum alloy or synthetic resin, and is a tabular member that has a substantially rectangular shape as viewed from the front. The movable portion 25 holds the image pickup device 23 on the incident light axis O that is a center portion.

Further, as viewed from the front of the image pickup unit 15, an upper end portion and a lower end portion (two end portions in the Y direction) of the movable portion 25 extend to an area between the permanent magnets 36 and 37 that are fixed to the base portion 24. The Y-direction driving coils 42 and the X-direction driving coils 43 are fixed to the upper end portion and the lower end portion of the movable portion 25.

Specifically, according to the present embodiment, the Y-direction driving coils 42 are arranged between the magnetic region portions for Y-direction driving 36a and 37a that are magnetized with opposite polarities in the Y direction of the permanent magnets 36 and 37. Further, the X-direction driving coils 43 are arranged between the magnetic region portions for X-direction driving 36b and 37b that are magnetized with opposite polarities in the X direction of the permanent magnets 36 and 37.

As described above, according to the present embodiment, the magnetic region portions for Y-direction driving 36a and 37a of the permanent magnets 36 and 37 and the Y-direction driving coil 42 arranged therebetween constitute a VCM for Y-direction driving that generates a force that moves the movable portion 25 in the Y direction. According to the present embodiment, the magnetic region portions for Y-direction driving 36a and 37a of the permanent magnets 36 and 37 are arranged at two places above and below the image pickup device 23 as viewed from the front, and hence a VCM for Y-direction driving is provided at two places so as to sandwich the image pickup device 23 in the vertical direction (Y direction).

Since the detailed configuration of a VCM is known, a detailed description is omitted here. However, for example, the VCM for Y-direction driving generates a force that moves the movable portion 25 in the Y direction by controlling a current value that flows in the Y-direction driving coil 42 inside a magnetic circuit constituted by the magnetic region portions for Y-direction driving 36a and 37a that are arranged facing each other in the front-to-rear direction, and the magnet support portions 32, the base portion 24, and the second magnetic body portions 32a and 31a that are magnetic bodies that are arranged at the front and rear of the magnetic region portions for Y-direction driving 36a and 37a. By adopting a configuration in which each Y-direction driving coil 42 is arranged between a pair of magnetic region portions for Y-direction driving 36a and 37a in this manner, a force generated by the VCM for Y-direction driving can be enhanced, to thereby enable miniaturization of the image pickup unit 15.

The magnetic region portions for X-direction driving 36b and 37b of the permanent magnets 36 and 37, and the respective X-direction driving coils 43 arranged therebetween constitute VCMs for X-direction driving that generate a force that moves the movable portion 25 in the X direction. Thus, by adopting a configuration in which each X-direction driving coil 43 is arranged between a pair of magnetic region portions for X-direction driving 36b and 37b, a force generated by the VCM for X-direction driving can be enhanced, to thereby enable miniaturization of the image pickup unit 15.

According to the present embodiment, since the magnetic region portions for X-direction driving 36*b* and 37*b* are provided at two end portions in the X direction of the two sets of permanent magnets 36 and 37, respectively, the magnetic region portions for X-direction driving 36*b* and 37*b* are disposed at four places surrounding the image pickup device 23. Therefore, according to the present embodiment, a VCM for X-direction driving is provided at four places surrounding the image pickup device 23.

Further, the pair of VCMs for X-direction driving that are disposed above and below the image pickup device 23 are disposed in a single row so as to overlap in the X direction with the respective VCMs for Y-direction driving. That is, according to the image pickup unit 15 of the present embodiment, the members constituting the VCMs are disposed only above and below the image pickup device 23, and members constituting the VCMs are not disposed on a left side or right side of the image pickup device 23. It is therefore possible to form the image pickup unit 15 in a small size. In addition, since the magnetic region portions for Y-direction driving and the magnetic region portions for X-direction driving are integrally formed in a single permanent magnet, a number of component parts can be reduced and a manufacturing cost can be decreased.

According to the image pickup unit 15, since the VCMs for X-direction driving are provided at four places surrounding the image pickup device 23, it is also possible to generate a moment that causes the movable portion 25 (image pickup device 23) to rotate around the incident light axis O by changing a strength of forces generated by the VCMs for X-direction driving at the four places.

Furthermore, hall elements 96 and 97 as magnetic force detection portions are arranged inside the Y-direction driving coils 42 and the X-direction driving coils 43 of the movable portion 25. According to the present embodiment, a change in a magnetic force that is caused by a relative movement of the movable portion 25 with respect to the permanent magnets 36 and 37 is detected by the hall elements 96 and 97 that are fixed to the movable portion 25, and thereby a position in the X direction and the Y direction of the movable portion 25 with respect to the base portion 24 is detected.

When shaking of the camera body 1 is detected by the gyro sensor, the image pickup unit 15 including the VCMs as described above moves the movable portion 25 in a direction that cancels out a blur of an image by controlling a current that flows to the Y-direction driving coil 42 and the X-direction driving coil 43 based on an output signal of the gyro sensor under the control of an unshown control portion. A blur of an image on the light receiving surface of the image pickup device 23 is corrected by this operation.

According to the image pickup unit 15 of the present embodiment as described above, the second magnetic body portions 32*a* and 31*a* composed of a magnetic body, such as iron, are fixed on faces that are on opposite sides to the faces on which the permanent magnets 36 and 37 constituting the VCMs are arranged on the magnet support portions 32 and the base portion 24. The second magnetic body portions 32*a* and 31*a* have substantially the same shape as the permanent magnets 36 and 37 when viewed from the front of the image pickup unit 15. Further, the second magnetic body portions 32*a* and 31*a* have substantially the same thickness as the magnet support portions 32 and the base portion 24.

Therefore, according to the image pickup unit 15 of the present embodiment, the front and rear of the permanent magnets 36 and 37 are surrounded by magnetic bodies that have a thickness that is approximately double the thickness of the base portion 24. By making only regions that constitute a yoke of the VCMs of the magnet support portions 32 and the base portion 24 thicker by fixing the second magnetic body portions 32*a* and 31*a* in this manner, leakage of the magnetic flux of the permanent magnets 36 and 37 to outside the VCMs can be prevented to thereby improve efficiency of the VCMs, and a force that the VCMs generate can be enhanced.

Further, according to the present embodiment, since a form is adopted in which the second magnetic body portions 32*a* and 31*a* are fixed at only regions constituting a yoke of the VCMs of the magnet support portions 32 and the base portion 24, a thickness of other regions of the magnet support portions 32 and the base portion 24 can be decreased by approximately half.

Thus, in the image pickup unit 15 that includes the image blur correction apparatus of the present embodiment, it is not necessary to make an entire area of the magnet support portions 32 and the base portion 24 thicker in order to prevent leakage of the magnetic flux of the permanent magnets 36 and 37. Consequently, in addition to enabling a reduction in weight of the magnet support portions 32 and the base portion 24, costs required for manufacture can be decreased by making the magnet support portions 32 and the base portion 24 a thickness that can be processed by press working.

Figure 8:
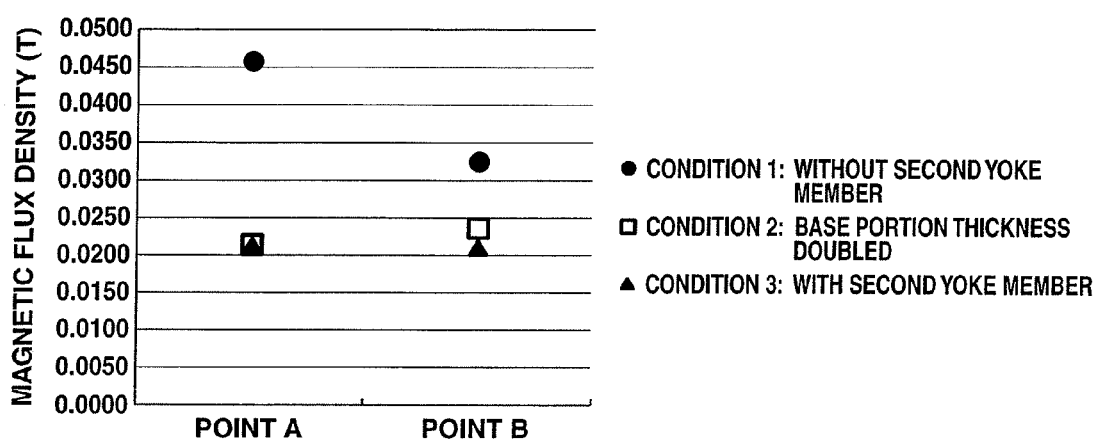
FIG. 8 is a graph that shows the result of a numerical simulation of leaking magnetic flux in the image pickup unit according to the present invention.

The applicants confirmed the effects of the image pickup unit 15 of the present embodiment as described above by numerical simulation. The results thereof are shown in FIG. 8. FIG. 8 is a view that illustrates the results of a numerical simulation of the magnetic flux density at a point A and a point B shown in FIG. 6 in a case where thickness conditions with respect to regions constituting a yoke of a VCM of the magnet support portions 32 and the base portion 24 were changed in an image pickup unit having the same form as that of the present embodiment. Point A is at a position that is further on the front outer side than the magnet support portions 32 of the VCM. Point B is at a position that is further on the rear outer side than the magnet support portions 32 of the VCM.

In FIG. 8, a condition 1 that is represented by a black circle indicates a case where the second magnetic body portions 32*a* and 31*a* have been removed from the image pickup unit 15 of the present embodiment. That is, condition 1 indicates a case where the thickness of regions constituting a yoke of a VCM of the magnet support portions 32 and the base portion 24 is made half the thickness according to the present embodiment. Further, a condition 2 that is represented by a white square indicates a case where the entire thickness of the magnet support portions 32 and the base portion 24 is made the same as the thickness of regions constituting a yoke of a VCM of the magnet support portions 32 and the base portion 24 according to the present embodiment. Furthermore, a condition 3 that is represented by a black triangle indicates a case in which the conditions are the same as in the present embodiment.

As shown in FIG. 8, the measurement result with respect to the image pickup unit 15 of the present embodiment (condition 3) shows that a magnetic flux density that is equal to the magnetic flux density in a case where the thickness of the entire magnet support portions 32 and base portion 24 is made double the thickness according to the present embodiment (condition 2) was measured at both point A and point B. That is, the image pickup unit 15 of the present embodiment can prevent leakage of the magnetic flux of the permanent magnets 36 and 37 and improve the efficiency of the VCMs in the same manner as when the entire magnet support portions 32 and base portion 24 are made thicker. Furthermore, a weight of the apparatus can be reduced and costs can be decreased in comparison to when the entire magnet support portions 32 and base portion 24 are made thicker.

Figure 9:
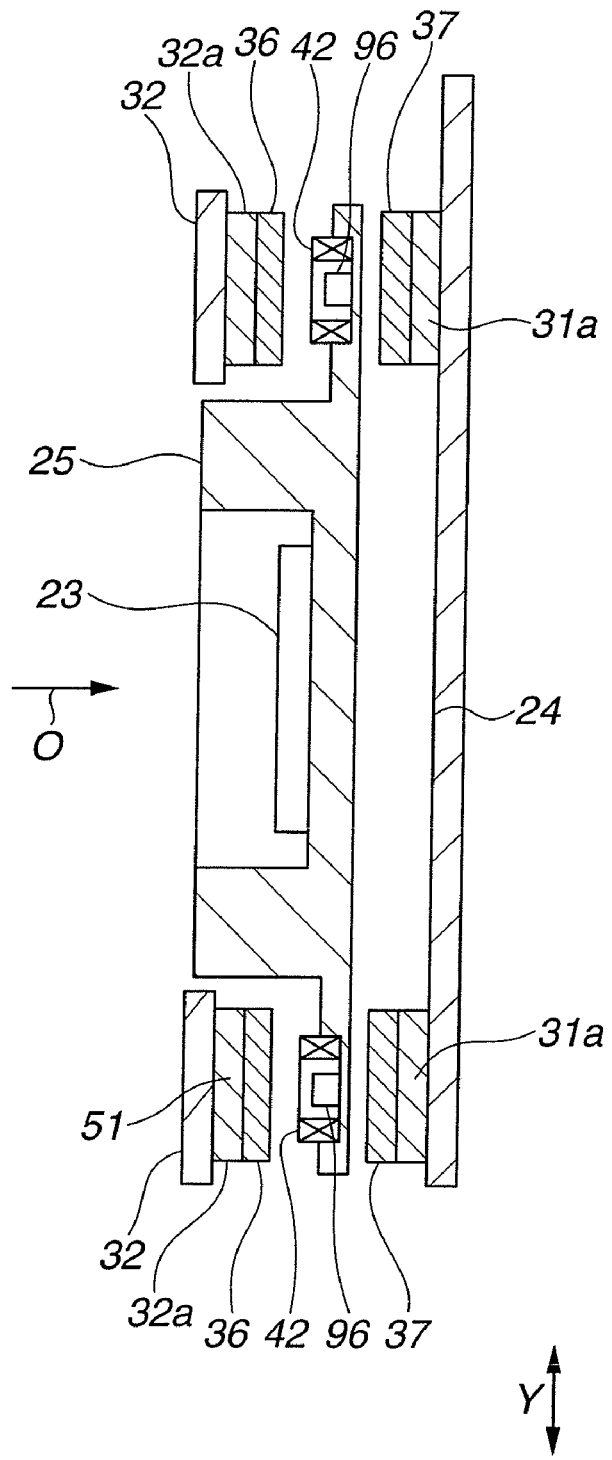
FIG. 9 is a view that illustrates a modification example of the image pickup unit.

Note that in the image pickup unit 15 that includes the image blur prevention apparatus as described above, although the second magnetic body portions 32a and 31a are fixed to faces on the outer side of the magnet support portions 32 and the base portion 24, respectively, as shown by a modification example illustrated in FIG. 9, a form may be adopted in which second yoke portions 32a and 31a are arranged between the magnet support portions 32 and the permanent magnet 36, and between the base portion 24 and the permanent magnet 37. According to the modification example shown in FIG. 9 also, because the thickness of a magnetic body at a region constituting a yoke of a VCM is the same as in the above described embodiment, the same advantageous effects as in the above described embodiment are obtained.

Although according to the above embodiment the VCMs have a configuration in which the X-direction driving coils 43 and the Y-direction driving coils 42 are sandwiched at the front and rear by a pair of permanent magnets 36 and 37, a configuration may also be adopted in which only either one of the permanent magnets 36 and 37 is provided.

Next, the configuration of a support portion that movably supports the movable portion 25 in the X direction and Y direction with respect to the base portion 24 in the image pickup unit 15 that has the image blur correction apparatus is described. The support portion includes the four ball members 34a, 34b, 34c, and 34d that are interposed between the movable portion 25 and the base portion 24, and four spring members 35a, 35b, 35c, and 35d that urge the movable portion 25 so as to bring the movable portion 25 close to the base portion 24.

A material that constitutes the ball members 34 is not particularly limited, and a metal such as iron, a resin, a ceramic material or the like can be used as the material constituting the ball members 34a, 34b, 34c and 34d. Preferably, the material constituting the ball members 34a, 34b, 34c and 34d is a non-magnetic body that has a high level of wear resistance and that is not affected by a magnetic force generated by a VCM. Hence, as one example according to the present embodiment, the ball members 34a, 34b, 34c and 34d are composed of a ceramic material.

Figure 3:
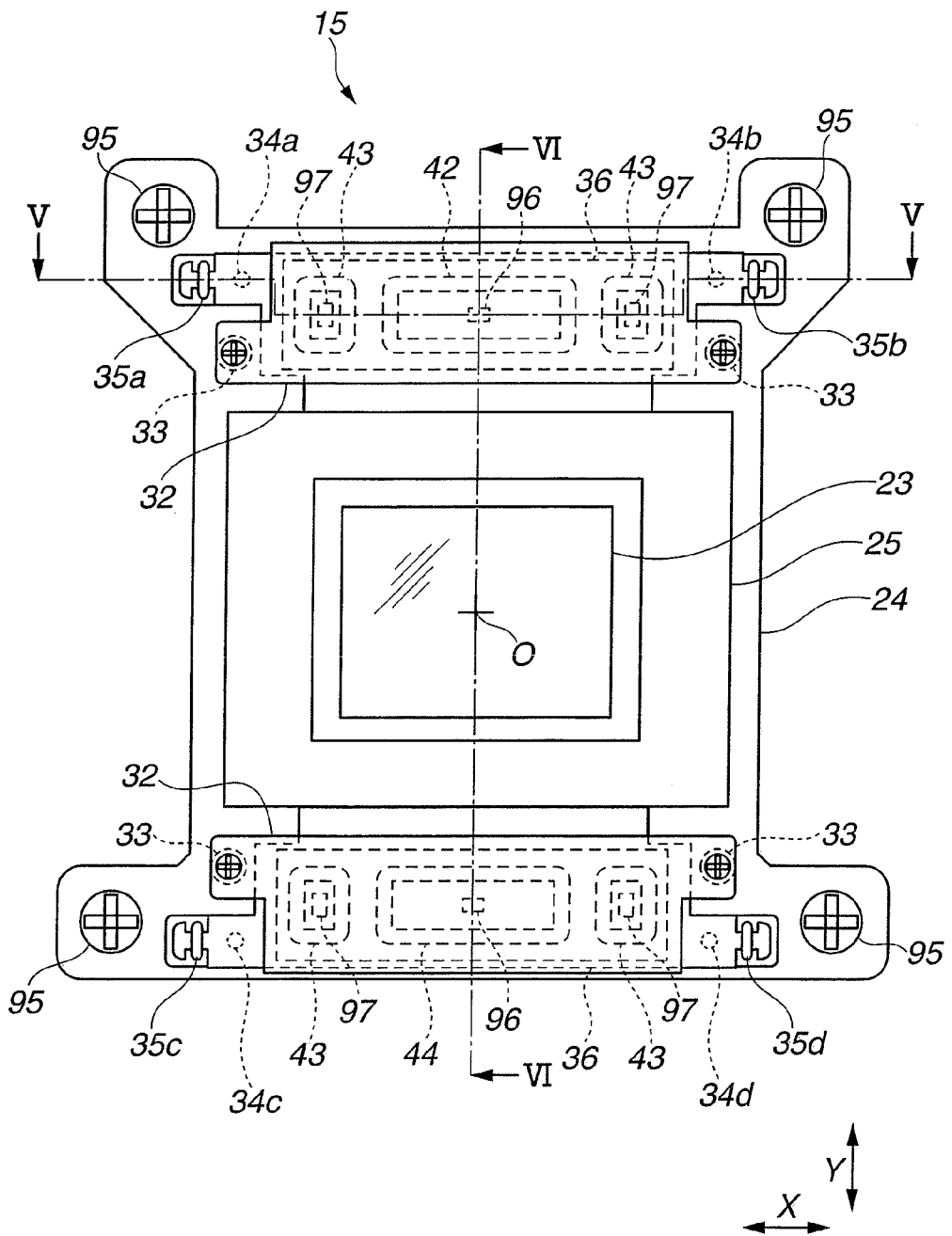
FIG. 3 is a front view of an image pickup unit that includes the image blur correction apparatus.
Figure 4:
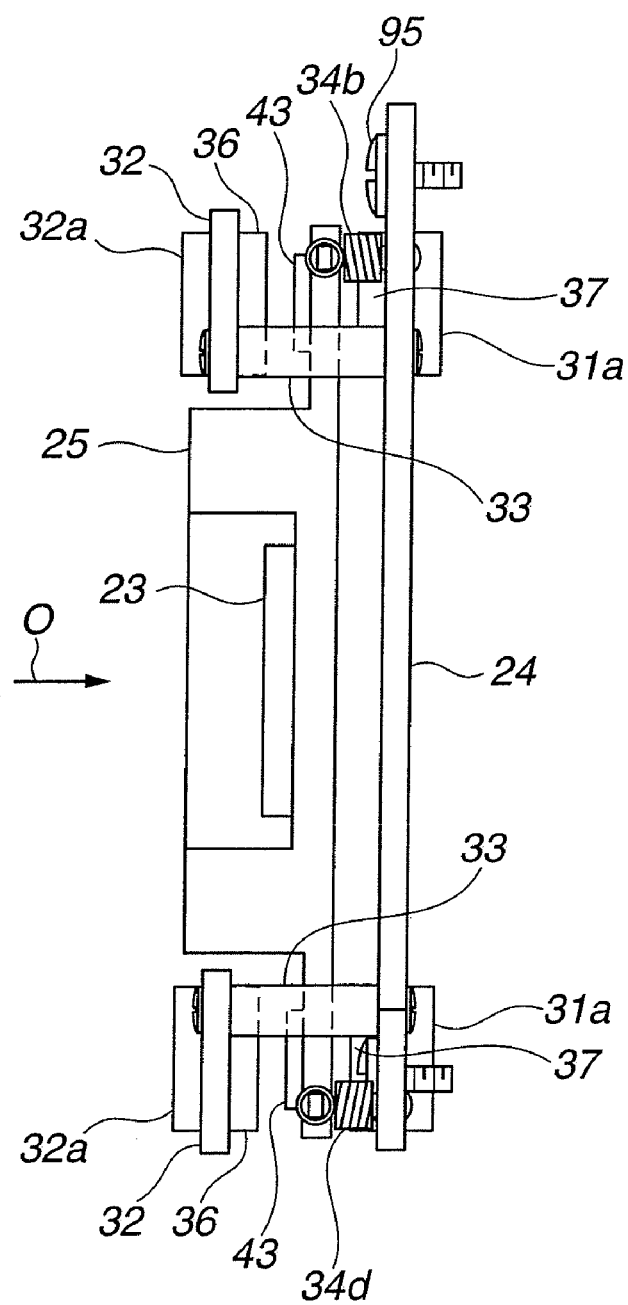
FIG. 4 is a side view of the image pickup unit as viewed from the right side.

The four ball members 34a, 34b, 34c and 34d are arranged around the image pickup device 23 as viewed from the front of the image pickup unit 15. In the following description, it is assumed that the ball members 34a, 34b, 34c and 34d are arranged at positions on upper left, upper right, lower left and lower right of the image pickup device 23, respectively, as viewed from the front of the image pickup unit 15 as shown in FIG. 3.

According to the present embodiment, the ball members 34a, 34b, 34c, and 34d are respectively arranged in the vicinity of four corners of the movable portion 25 that has a substantially rectangular shape. More specifically, the ball members 34a and 34b are arranged on both sides in the X direction of the VCM for Y-direction driving and the VCM for X-direction driving arranged above the aforementioned image pickup device 23. Further, the ball members 34c and 34d are arranged on both sides in the X direction of the VCM for Y-direction driving and the VCM for X-direction driving that are arranged below the image pickup device 23.

Figure 5:
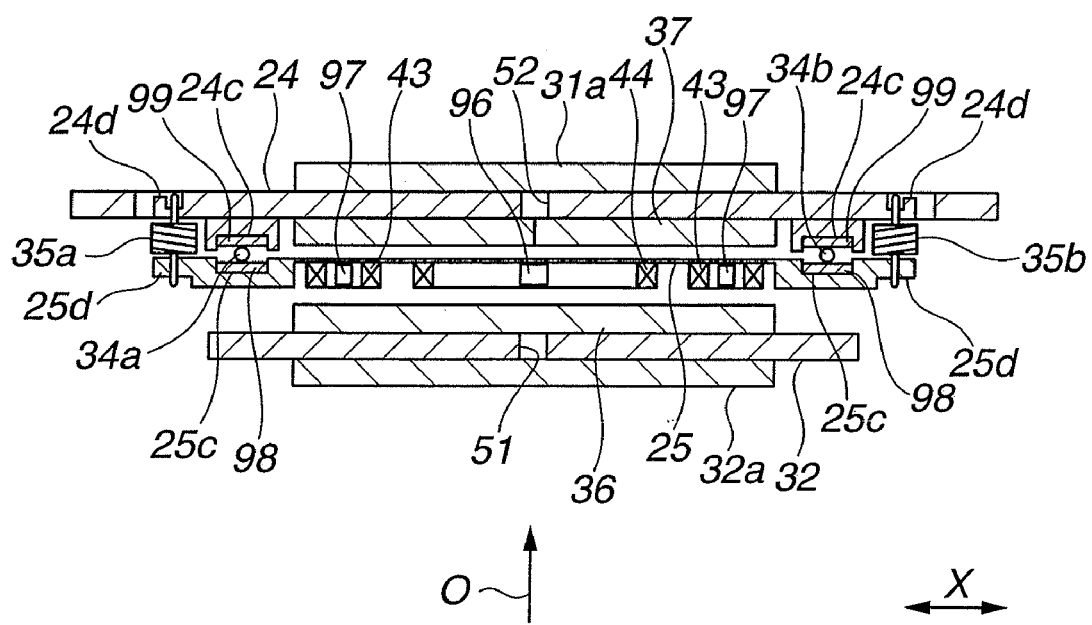
FIG. 5 is a sectional view along a line V-V in FIG. 3.
Figure 6:
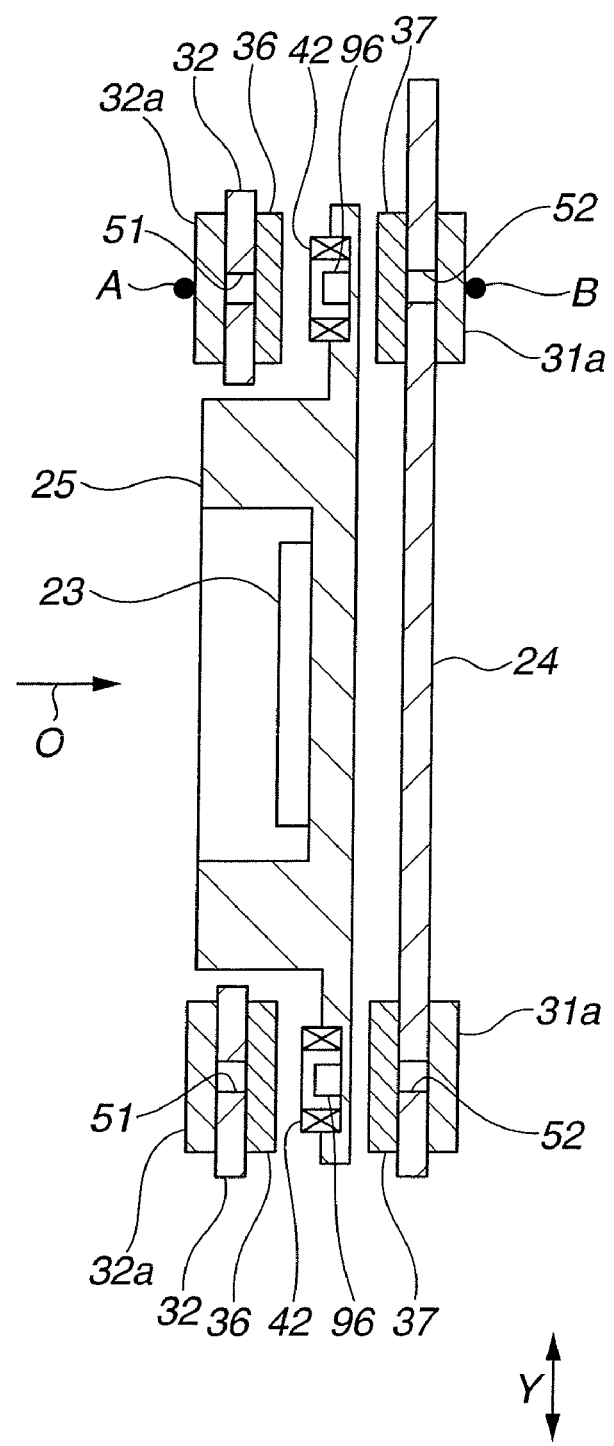
FIG. 6 is a sectional view along a line VI-VI in FIG. 3.

As shown in FIG. 5, concave portions 25c and 24c for preventing the ball members 34a, 34b, 34c and 34d from falling out are provided in regions in which the ball members 34a, 34b, 34c and 34d are provided of the movable portion 25 and the base portion 24. Wear prevention plates 98 and 99 are fixed to a bottom surface portion of the concave portions 25c and 24c that contact with the ball members 34a, 34b, 34c, and 34d. The wear prevention plates 98 and 99 are composed of a material with a high level of wear resistance, such as a stainless alloy. Note that a form may also be adopted in which the wear prevention plates 98 and 99 are not provided, and a surface treatment such as a coating with a high wear resistance is applied with respect to the bottom surface portions of the concave portions 25c and 24c.

The spring members 35a, 35b, 35c, and 35d are arranged in the vicinity of the ball members 34a, 34b, 34c and 34d, respectively, and have elasticity that urges the movable portion 25 in a direction that brings the movable portion 25 close to the base portion 24. In other words, the spring members 35a, 35b, 35c, and 35d are members that impart a preload to the ball members 34a, 34b, 34c and 34d.

Although the configuration of the spring members 35a, 35b, 35c, and 35d is not particularly limited, as one example according to the present embodiment, the spring members 35a, 35b, 35c, and 35d are coil springs that are composed of a metal. The material that constitutes the spring members 35a, 35b, 35c, and 35d is not limited to a metal, and may be a rubber or a synthetic resin such as a plastic. As shown in FIG. 5, both ends of the spring members 35a, 35b, 35c, and 35d are engaged with engagement portions 25d and 24d that are provided in the movable portion 25 and the base portion 24.

According to the support portion of the image pickup unit 15 of the present embodiment, urging forces that the four spring members 35a, 35b, 35c, and 35d generate are set so as to satisfy the following conditions.

In a case where the movable portion 25 is positioned at approximately a center of a movable range thereof with respect to the base portion 24, two of the four spring members generate a predetermined first urging force F1, and the remaining two spring members generate a predetermined second urging force F2 that is stronger than the predetermined first urging force F1. If a state in this case is expressed as F2=α·F1, then α is a value greater than 1. Further, the spring members that are at diagonal positions facing each other in a manner such that the image pickup device 23 is sandwiched therebetween are arranged so as to generate different urging forces to each another.

For example, when the urging forces generated by spring members 35a, 35b, 35c, and 35d are referred to as Fa, Fb, Fc, and Fd, respectively, in a case where the spring members 35a and 35b on the upper left and upper right of the image pickup device 23 are set so as to generate the first urging force F1, the spring members 35c and 35d on the lower left and lower right are set so as to generate the second urging force F2 that is stronger than the first urging force F1. That is, α·Fa=α·Fb=Fc=Fd.

Further, for example, when the spring members 35b and 35d on the upper right and lower right of the image pickup device 23 are set so as to generate the first urging force F1, the spring members 35a and 35c on the upper left and lower left are set so as to generate the second urging force F2. More specifically, α·Fb=α·Fd=Fa=Fc.

In other words, among the spring members 35a, 35b, 35c, and 35d that are arranged at positions at four corners of a quadrilateral, an urging force generated by two spring members positioned at both ends of a predetermined single side of the quadrilateral is set to be stronger by a multiple α than an urging force generated by the other two spring members.

By setting a difference in the urging forces generated by spring members located at diagonal positions with respect to each other among the spring members 35a, 35b, 35c, and 35d that are arranged at positions at four corners of a quadrilateral in this manner, the two ball members in the vicinity of the two spring members that generate the strong second urging force F2 invariably abut against the movable portion 25 and the base portion 24 with a predetermined urging force (preload).

Consequently, even if variations arise with respect to the sizes of the clearances between the ball members 34a, 34b, 34c and 34d that are arranged in four corners of the quadrilateral and the movable portion 25 and base portion 24, respectively, due to dimensional tolerances of the members, the ball members in the vicinity of the spring members that generate the strong second urging force F2 that are positioned at both ends of a predetermined single side of the quadrilateral invariably abut against the movable portion 25 and the base portion 24.

Thus, according to the present embodiment, even when the movable portion 25 is supported by balls at four points with respect to the base portion 24, the movable portion 25 can be stably moved even without performing adjustment of a preload at the four points.

It is known that, when supporting a movable portion with balls with respect to a base portion, if ball supports are used at three points surrounding the center of gravity of the movable portion, backlash does not occur at any of ball support portions, and the movable portion can be supported with the most stability. However, in a case such as that of the image pickup unit 15 of the present embodiment in which members constituting a VCM for X-direction driving and a VCM for Y-direction driving are integrated and collectively disposed above and below the image pickup device 23, it is difficult to suitably dispose three ball supports around the center of gravity of the movable portion 25, and it is necessary to use four ball supports.

According to a conventional configuration that uses ball supports at four points, backlash occurs at any one of the ball support portions, and in order to reduce the backlash to an ignorable level it is necessary to reduce a dimensional tolerance of each member or provide an adjustment mechanism. There is thus a problem that manufacturing costs increase.

With respect to this problem, the image pickup unit 15 of the present embodiment employs four ball supports and urges the movable portion 25 toward the base portion 24 under the conditions mentioned above. Hence, the movable portion 25 can be stably supported so as to minimize backlash while avoiding an increase in manufacturing costs.

Note that the applicants confirmed by experimentation that when the value of the aforementioned α is 1.5 or more, control of movement of the movable portion 25 can be performed stably, and when the value of α is approximately 2, control of movement of the movable portion 25 can be performed more stably. It is therefore preferable that the value of α is 1.5 or more, and more preferably the value of α is approximately 2.

Note that a method that changes the urging forces generated by the spring members 35a, 35b, 35c, and 35d by means of the arrangement positions thereof is not particularly limited. For example, the urging forces generated by the spring members 35a, 35b, 35c, and 35d can be changed by means of the arrangement positions thereof by adopting a method that changes a natural length of the spring members, a method that changes a spring constant of the spring members, or a method that changes a distance to the engagement portions 24d and 25d or the like.

For example, if a method is adopted that changes a distance to the engagement portions 24d and 25d depending on a location, coil springs that have the same shape and characteristics can be used for the four spring members 35a, 35b, 35c, and 35d, and thus errors with respect to fitting positions of the respective spring members when assembling the image pickup unit 15 can be prevented.

Further, as a method for preventing errors with respect to the fitting positions when characteristics of the spring members are varied, a method can be considered in which the colors of the spring members are varied according to differences in the urging forces generated by the spring members, or a method can be considered in which a winding number or a shape of hook portions for engaging the spring members with the engagement portions 24d and 25d are varied.

Note that although the camera 10 of the above described embodiment is configured so that the lens unit 2 is detachable from the camera body 1, a configuration may also be adopted in which the camera body 1 and the lens unit 2 are integrally constructed.

Note that the present invention is not limited to the above-mentioned embodiment, but may be suitably changed without departing from the spirit or concept of the invention readable from the appended claims and the entire specification, and an image blur correction apparatus and a camera with such changes are also included in the technical scope of the present invention.

For example, although the image blur correction apparatus of the above described embodiment has a form that reduces an image blur by moving an image pickup device, the image blur correction apparatus according to the present invention may have a form that reduces an image blur by moving an optical element such as a lens or a prism.

The image blur correction apparatus according to the present invention can be applied not only to a digital camera as described in the foregoing embodiment, but can also be applied to an electronic device equipped with a photographing function such as, for example, a sound recording device, a portable telephone, a PDA, a personal computer, a game machine, a digital media player, a television, a GPS, a watch and the like.

What is claimed is:

1. An image blur correction apparatus, comprising:
   a tabular base portion;
   a movable portion that is supported so as to be movable in a first direction and a second direction that are orthogonal to an incident light axis with respect to the base portion, and that holds an image pickup device; and
   a voice coil motor that has a permanent magnet arranged on a face of the base portion that faces the movable portion, and a coil arranged in a region of the movable portion facing the permanent magnet, and that generates a force that moves the movable portion by an electromagnetic force;
   wherein:
   the base portion comprises a magnetic body; and
   a tabular second magnetic body portion comprising a magnetic body that, when viewed from the incident light axis direction, occupies a region surrounding an external shape of the permanent magnet is arranged on the base portion side of the permanent magnet.

2. The image blur correction apparatus according to claim 1, wherein:
   the second magnetic body portion is fixed on an opposite side to a face on which the permanent magnet is arranged of the base portion; and
   the permanent magnet is fixed to the base portion by an adhesive that is filled in a through-hole formed at a position corresponding to a boundary portion of a magnetic pole of the permanent magnet of the base portion.

3. The image blur correction apparatus according to claim 2, wherein the second magnetic body portion is fixed to the base portion by the adhesive that is filled in the through-hole.

4. The image blur correction apparatus according to claim 1, wherein:
   the voice coil motor comprises a second permanent magnet that has an identical shape to the permanent magnet, and that is provided facing the permanent magnet so as to sandwich the coil between the permanent magnet and the second permanent magnet;
   the second permanent magnet is fixed to a magnet support portion comprising a tabular magnetic body that is fixed to the base portion; and
   another second magnetic body portion is fixed on the magnet support portion side of the second permanent magnet.

5. The image blur correction apparatus according to claim 4, wherein:
   the other second magnetic body portion is fixed on an opposite side to a face on which the second permanent magnet is arranged of the magnet support portion; and
   the second permanent magnet is fixed to the magnet support portion by an adhesive that is filled in a through-hole formed at a position of the magnet support portion corresponding to a boundary portion of a magnetic pole of the permanent magnet.

6. The image blur correction apparatus according to claim 5, wherein the second magnetic body portion is fixed to the magnet support portion by the adhesive that is filled in the through-hole.

7. A camera comprising an image blur correction apparatus according to any one of the claims 1 to 6.

* * * * *